United States Patent
Voigt et al.

(10) Patent No.: US 10,527,116 B2
(45) Date of Patent: Jan. 7, 2020

(54) BRAKE DISC COMPRISING A FRICTION RING AND A HUB PRODUCED AS A SEPARATE ELEMENT AND ARRANGED INSIDE OF THE FRICTION RING

(71) Applicants: Volkswagen Aktiengesellschaft, Wolfsburg (DE); Dr. Ing H.C.F. Porsche Aktiengesellschaft, Stuttgart (DE); IPROTEC Maschinen- und Edelstahlprodukte GmbH, Petershagen-Friedewalde (DE)

(72) Inventors: Jan Voigt, Braunschweig (DE); Andreas Higle, Stuttgart (DE); Boris Smedek, Leonberg (DE); Christoph Oger, Karlsruhe (DE); Dahoud Rabih, Stuttgart (DE)

(73) Assignees: Volkswagen Atiengesellschaft, Wolfsburg (DE); Dr. Ing H.C.F. Porsche Aktiengesellschaft, Stuttgart (DE); IPROTEC Maschinen- und Edelstahlprodukte GmbH, Petershagen-Friedewalde (DE)

( * ) Notice: Subject to any disclaimer, the term of this patent is extended or adjusted under 35 U.S.C. 154(b) by 75 days.

(21) Appl. No.: 15/626,605

(22) Filed: Jun. 19, 2017

(65) Prior Publication Data
US 2017/0284490 A1    Oct. 5, 2017

Related U.S. Application Data

(63) Continuation of application No. PCT/EP2015/078589, filed on Dec. 3, 2015.

(30) Foreign Application Priority Data

Dec. 17, 2014    (DE) .................. 10 2014 226 244

(51) Int. Cl.
*F16D 65/12* (2006.01)
*F16D 65/02* (2006.01)

(52) U.S. Cl.
CPC ...... *F16D 65/123* (2013.01); *F16D 2065/136* (2013.01); *F16D 2065/1316* (2013.01);
(Continued)

(58) Field of Classification Search
CPC ................. F16D 65/12; F16D 65/128; F16D 2065/1316; F16D 2065/1328; F16D 2065/1392 *F16D 2065/1356* (2013.01); *F16D 2065/1384* (2013.01); *F16D 2200/003* (2013.01); *F16D 2200/0013* (2013.01); *F16D 2250/003* (2013.01); *F16D 2250/0007* (2013.01); *F16D 2250/0023* (2013.01)

(56) References Cited

U.S. PATENT DOCUMENTS 6,250,296 B1     6/2001 Norris et al.
2003/0159893 A1*  8/2003 Tironi ................ B22D 11/0405
                                                   188/71.1
(Continued)

FOREIGN PATENT DOCUMENTS

DE    4200 418 C1    12/1992
DE    1993 1140 A1    2/2000
(Continued)

OTHER PUBLICATIONS

International Search Report dated Mar. 30, 2016 (English Translation).

*Primary Examiner* — Robert A. Siconolfi
*Assistant Examiner* — San M Aung
(74) *Attorney, Agent, or Firm* — Muncy, Geissler, Olds & Lowe, P.C.

(57) ABSTRACT

A brake disc having a friction ring and a hub produced as a separate element and arranged inside the friction ring according. Recesses are configured in the friction ring on the inside to connect the hub to the friction ring and corresponding projections are formed on the hub, which projections
(Continued)

engage in the recesses of the friction ring in order to be able to transfer torque from the friction ring to the hub. The recesses have an undercut at least partially in a radial direction, as viewed looking inward from the outside. The disc is simple and cost-effective to manufacture and has an acoustically advantageous operating performance, in particular in the case of thermal expansion.

8 Claims, 3 Drawing Sheets

(58) Field of Classification Search
USPC .................................................. 188/218 XL
See application file for complete search history.

(56) References Cited

U.S. PATENT DOCUMENTS

| 2006/0049011 A1 | 3/2006 | Jacob |
| 2008/0128229 A1 | 6/2008 | Pahle |
| 2009/0090436 A1* | 4/2009 | Chenoweth ............. C21D 6/04 |
| | | 148/557 |
| 2009/0218183 A1* | 9/2009 | Burgoon ................ B60T 8/329 |
| | | 188/218 XL |
| 2010/0051398 A1* | 3/2010 | Spacek ................... F16D 65/12 |
| | | 188/218 XL |
| 2012/0037467 A1* | 2/2012 | Kokott .................. F16D 65/123 |
| | | 188/218 XL |
| 2014/0202803 A1* | 7/2014 | Kokott .................... F16D 65/12 |
| | | 188/218 XL |
| 2014/0224603 A1* | 8/2014 | Kokott ................. F16D 65/123 |
| | | 188/218 XL |

FOREIGN PATENT DOCUMENTS

| DE | 69908785 T2 | 5/2004 |
| DE | 1035 8088 A1 | 7/2005 |
| DE | 10200 5023 380 B3 | 10/2006 |
| DE | 1983 6688 A1 | 4/2007 |
| DE | 102011 084946 A1 | 4/2013 |
| WO | WO 2005 095816 A1 | 10/2005 |
| WO | WO 2007 04 1518 A2 | 4/2007 |

* cited by examiner

BRAKE DISC COMPRISING A FRICTION RING AND A HUB PRODUCED AS A SEPARATE ELEMENT AND ARRANGED INSIDE OF THE FRICTION RING

This nonprovisional application is a continuation of International Application No. PCT/EP2015/078589, which was filed on Dec. 3, 2015, and which claims priority to German Patent Application No. 10 2014 226 244.5, which was filed in Germany on Dec. 17, 2014, and which are both herein incorporated by reference.

BACKGROUND OF THE INVENTION

Field of the Invention

The invention relates to a brake disc comprising a friction ring and a hub produced as a separate element and arranged inside the friction ring. The invention also relates to brake discs for motor vehicles, including for motor vehicles that have a vehicle weight of at least 500 kg.

Description of the Background Art

DE 102 56 589 B4 discloses a brake disc for a motor vehicle; the disc has a friction ring and a hub produced as a separate element and arranged inside the friction ring, a disc in which the friction ring and the hub are connected together via separate connecting elements.

Further brake discs, which have a friction ring and a hub produced as a separate element and arranged inside the friction ring and in which the hub and the friction ring are connected together via separate connecting elements, are known from EP 0 985 843 A1 and DE 10 2011 115 290 A1, which are both herein incorporated by reference.

It is problematic in the prior-art brake discs, produced as two parts and having a friction ring and a hub produced as a separate element and arranged inside the friction ring, that due to different expansions of the elements, i.e., the friction ring and hub, in particular due to a typically rather great expansion of the outwardly arranged friction ring, a thermal expansion gap forms between the elements, which enlarges with increasing heating. It must be considered in this case that due to the operational action of brake pads and the resulting energy transfer, the outer friction ring heats up much more greatly than the hub. Thermal expansion gaps have a negative effect on the load-bearing behavior of the connection between the friction ring and hub. Further, this can cause acoustic anomalies (rattling).

SUMMARY OF THE INVENTION

It is therefore an object of invention to provide a brake disc comprising a friction ring and a hub produced as a separate element and arranged inside the friction ring, which disc is simple and cost-effective to manufacture and has an acoustically advantageous operating performance, in particular in the case of thermal expansion.

In an exemplary embodiment, a brake disc comprises a friction ring and a hub produced as a separate element and arranged inside the friction ring, whereby recesses are formed in the friction ring on the inside to connect the hub to the friction ring and corresponding projections are formed on the hub, which projections engage in the recesses of the friction ring in order to be able to transfer torque from the brake disc to the hub (and from the hub to the wheel hub connected thereto). To this end, the recesses have an undercut at least partially in a radial direction, as viewed looking inward from the outside. A friction ring in the present case can be understood to mean in particular elements that are made as one piece and surround the hub in a circular manner. A hub in the present case can be understood to mean in particular elements that are made as one piece and also have a basic circular shape and are used to produce a rotationally fixed connection to a wheel hub and produce a rotationally fixed connection to a friction ring, in order to be able to transfer braking torque from the friction ring to the hub upon application of braking forces in the friction ring and thus to reduce the speed of a motor vehicle. A brake disc of the invention has the advantage that it is simple and cost-effective to manufacture. Moreover, it also has functional advantages insofar as a thermal expansion of the friction ring and a resulting radial movement of the friction ring outwardly can be counteracted by the undercut formed in the friction ring. Stated differently, the friction ring, if it wants to expand radially outward, is limited in its movement due to the undercuts. As soon as the recesses formed in the friction ring come into contact with the corresponding projections of the hub, due to the recesses a force acts between the friction ring and hub in the area of the projections and recesses, which is opposed at least partially to a further expansion. This effect intensifies due to further thermal expansion, so that there is an increasingly stabilizing connection between the hub and the friction ring. It is important therefore, however, that the recesses and the corresponding projections are designed for the maximum arising forces in order to prevent the projections or the recesses from failing due to too high stress or forces.

If, as in the case of undercuts, or in some other suitable manner the recesses formed in the friction ring and the projections formed in the hub are configured in such a way that a thermal expansion due to the geometries of the recesses and the projections on the friction ring in the area of the recesses produces a force acting inward at least partially in the radial direction, a gap formation due to said geometry is specifically counteracted. In this case, with an increasing thermal expansion the force acting on the friction ring and directed at least partially radially inward also increases. Therefore, there is a self-amplifying effect by a force acting as a restoring force which specifically counteracts the effort of the friction ring to move away outwardly from the hub.

The assembly and production of a brake disc of the invention are especially simple, if the friction ring is fixed relative to the hub against expansion in the radial direction solely by the undercuts or by the force produced by the thermal expansion and acting at least partially radially inward. In this case, the hub and the friction ring must be joined together only in the axial direction in order to produce a rotationally fixed connection between the friction ring and the hub and to effect a fixing of the friction ring relative to the hub in the radial direction as well (in particular in the case of greater thermal expansion of the friction ring in comparison with the hub) independent of additional connecting elements (and in particular completely without any such additional connecting elements). The fixing of the friction ring relative to the hub in the axial direction can occur by means of a transition fit or a press fit without other connections, if a tensioning is to be produced between hub and friction ring. This has the advantage that the elements are also fixed directly to one another axially. Alternatively, the friction ring and the hub can also be fixed to one another in a different suitable manner, in particular via a circlip, a bolt, or another element. Thermal joining can be omitted, if desired, in the production of a brake disc of the invention, if no joining forces are to act in the joining zone between the hub and the friction ring. In this case, temperature-control measures are also not necessary in the production process.

The stress distribution in a brake disc of the invention is especially advantageous, if the recesses have at least in part a continuous contour in a side view. This means that the recesses in the side view only have a radii or at least one arc-shaped contour.

In an embodiment, with respect to the production of a brake disc of the invention, the recesses at least in part have an arcuate or cycloid-shaped contour in a side view. Such contours can be fabricated especially cost-effectively, whereby reference is made in this regard in particular to a cycloid-shaped contour. Cycloid-shaped contours can be produced in particular by turning, so that a far more cost-intensive milling is not necessary.

In an embodiment of the invention, the recesses can have at least partially a polygonal contour in a side view. Polygonal contours can also be produced simply and cost-effectively, whereby in this respect preferably at least rectangular contours or more than rectangular contours are used in order to keep the angle in the area of the corners greater than 120°. Further in addition radii can be provided in the area of the corners. Angles and radii of this kind are preferred in order to keep the stress in the area of the corners low.

In an embodiment of the invention, the brake disc can have an inner side with arcuate sections, whereby the recesses extend radially outward from the arcuate sections, whereby the recesses at least in part have at least one region which lies further outward as viewed in the radial direction and in which the recess is broader in the circumferential direction than in the area of the arcuate section. A design of this kind is especially suitable for realizing the concept of the invention insofar as a friction ring of a brake disc of this kind can be produced simply and cost-effectively as a gray cast iron part.

In an embodiment of the invention, at least three recesses with undercuts are formed in the friction ring, whereby at least three corresponding projections, engaging in the area of the undercuts, are formed in the hub. It is preferable if at least 4, particularly preferably at least 5, and more preferably at least 6 recesses with undercuts are formed in the friction ring and an equivalent number of corresponding projections is formed on the hub.

If the friction ring and the hub are made of different materials, the advantages of the brake disc of the invention become particularly important. This applies in particular to cases in which a material with a lower density and/or with a lower thermal conductivity is used for the hub. In this respect, reference is made in particular to friction rings made of gray cast iron and to hubs made of a light metal, for example, of aluminum.

It was already pointed out that the production or finishing of a hub made as a cast part or forged part or a friction ring can occur especially simply and cost-effectively, if the recesses and/or the projections are formed using a tool that is moved at least partially on a hypocycloid curve. In this respect, it is preferable if the hub is produced as a cast part or forged part and is finished mechanically by turning and/or milling. Milling is a consideration in particular for more complex geometries of the projections or recesses.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figures 1, 2:
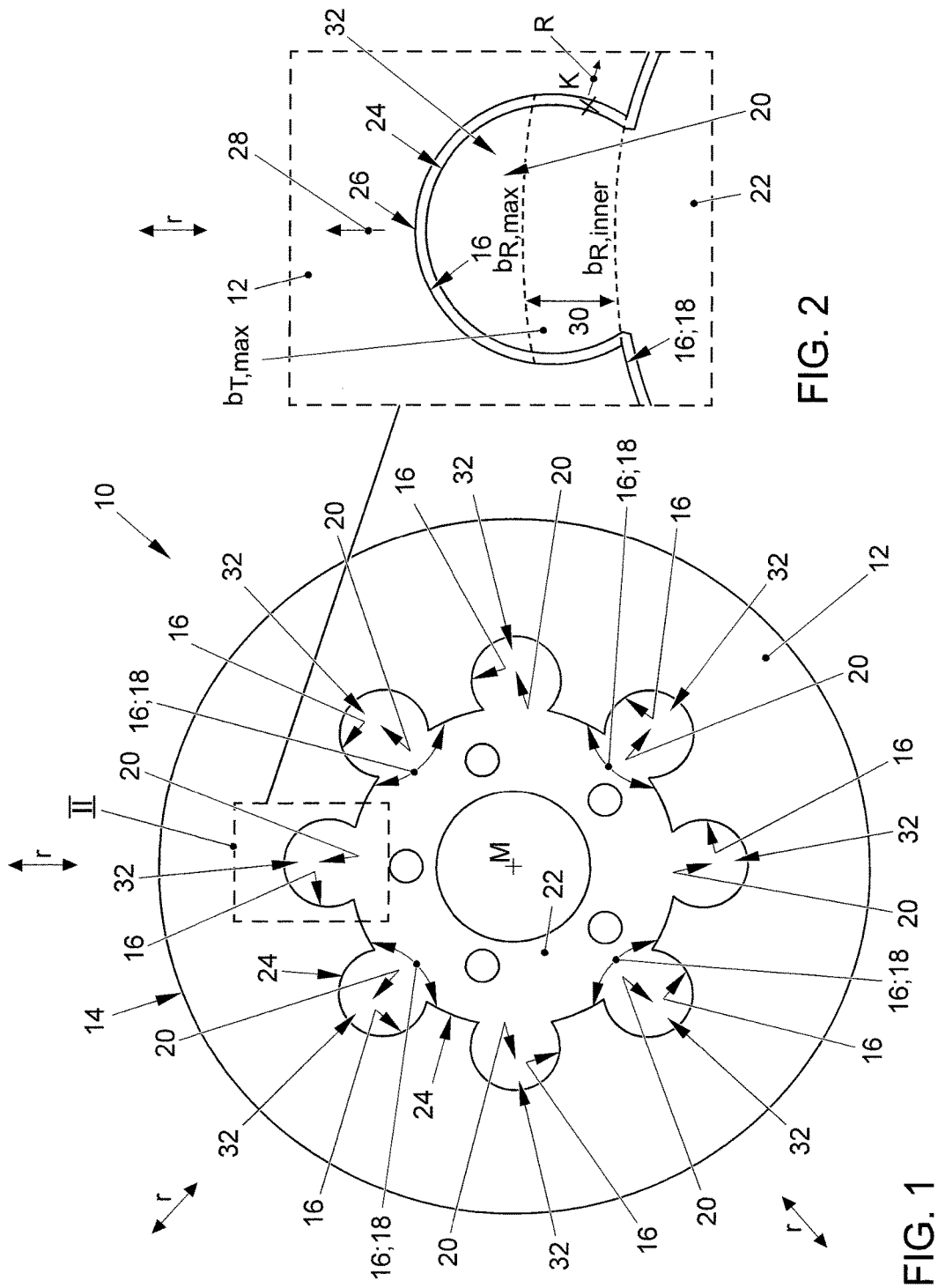
FIG. 1 shows a schematic illustration of an embodiment of a brake disc of the invention in a side view.
FIG. 2 shows the area, labeled with II in FIG. 1, in an enlarged illustration.

FIG. 1 shows a first embodiment of a brake disc 10 of the invention. Brake disc 10 comprises a friction ring 12 having an outer side 14, which is circular in side view, and an inner side 16, which comprises alternately arcuate sections 18 and recesses 20 extending in the radial direction r.

On the inside of friction ring 12, a hub 22 is disposed whose outer side 24 in the illustrated embodiment is formed complementary to inner side 16 of friction ring 12. Friction ring 12 has projections 32 formed complementary to recesses 20.

FIG. 2 shows an enlarged illustration of friction ring 12 in the area of a recess 20 together with the complementarily formed hub 22. It is clearly evident in this figure that recess 20 has an undercut in the area of inner side 16 of friction ring 12 in the radial direction as viewed looking inward from the outside (i.e., oriented toward center M of brake disc 10). This means that the contour narrows from point 26 of recess 20, said point being outermost as viewed looking outward in the radial direction, to arcuate sections 18 at at least one place. In the embodiment shown in FIG. 2, the width increases in the radial direction, as viewed looking inward from the outside, up to the area labeled with $b_{R,max}$ and then decreases from this area in the radial direction, as viewed looking inward from the outside, up to the area labeled with $b_{R,inner}$. The terms $b_{R,max}$ and $b_{R,inner}$ here stand for the arc lengths b in the area of arcuate sections 18 or in the area with the greatest extent of recess 20 in the circumferential direction. Region 30, extending in the radial direction, between the arcuate area $b_{R,max}$ and $b_{R,inner}$ is an undercut in the context of the invention.

If there is an operational heating of friction ring 12 of brake disc 10, in particular due to the friction of brake pads coming into contact with friction ring 12, this has the result that brake disc 10 expands in the radial direction according to arrow 28 in relation to hub 22. Hub 22 typically heats up less greatly and, for reasons of saving of weight, often consists of a material with a lower coefficient of thermal expansion. Both of these circumstances, independently of one another, have the result that friction ring 12 upon heating moves outward in the radial direction and therefore the distance between outer side 24 of hub 22 and inner side 16 of friction ring 12 increases.

In FIG. 2, $b_{T,max}$ designates the maximum extent (arc length) of hub 22 in the area of projection 32, shown in FIG. 2, in the circumferential direction. Said arc length $b_{T,max}$ in the shown embodiment is designed such that it is greater than the arc length $b_{R,inner}$ in the area of arcuate sections 18, if friction ring 12 and hub 22 are at ambient temperatures (typically between −30° C. and +50° C.).

This assures that in the case of an increasing thermal expansion, friction ring 12 due to the undercut can only move so far radially outward until projections 32 come to rest against recesses 20 in the undercut area. A further heat input in friction ring 12 has the result that projections 32 deform with friction ring 12.

Figure 3:
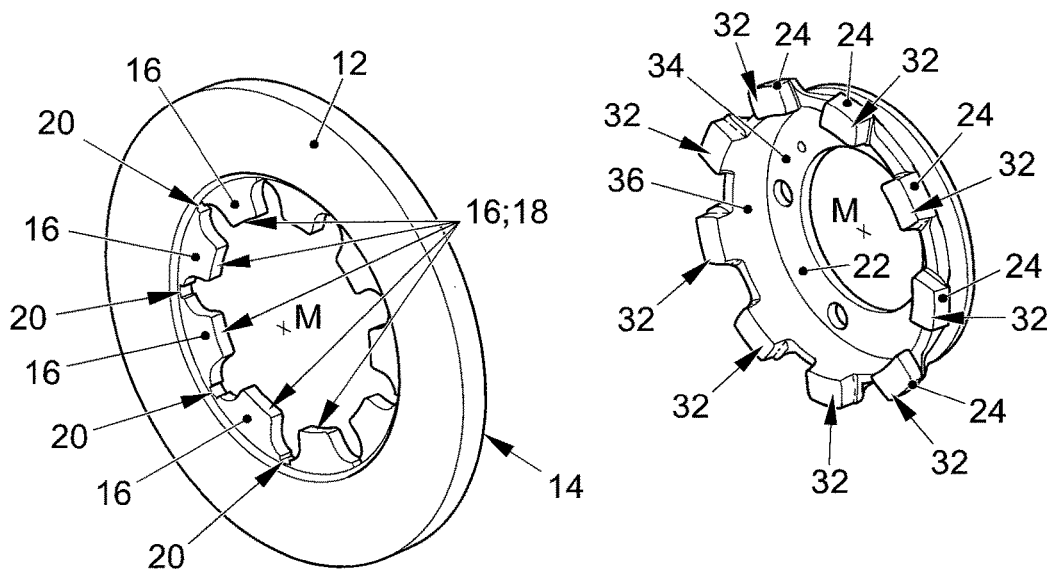
FIG. 3 shows a perspective illustration of an embodiment of a brake disc of the invention in an exploded illustration.
Figure 4:
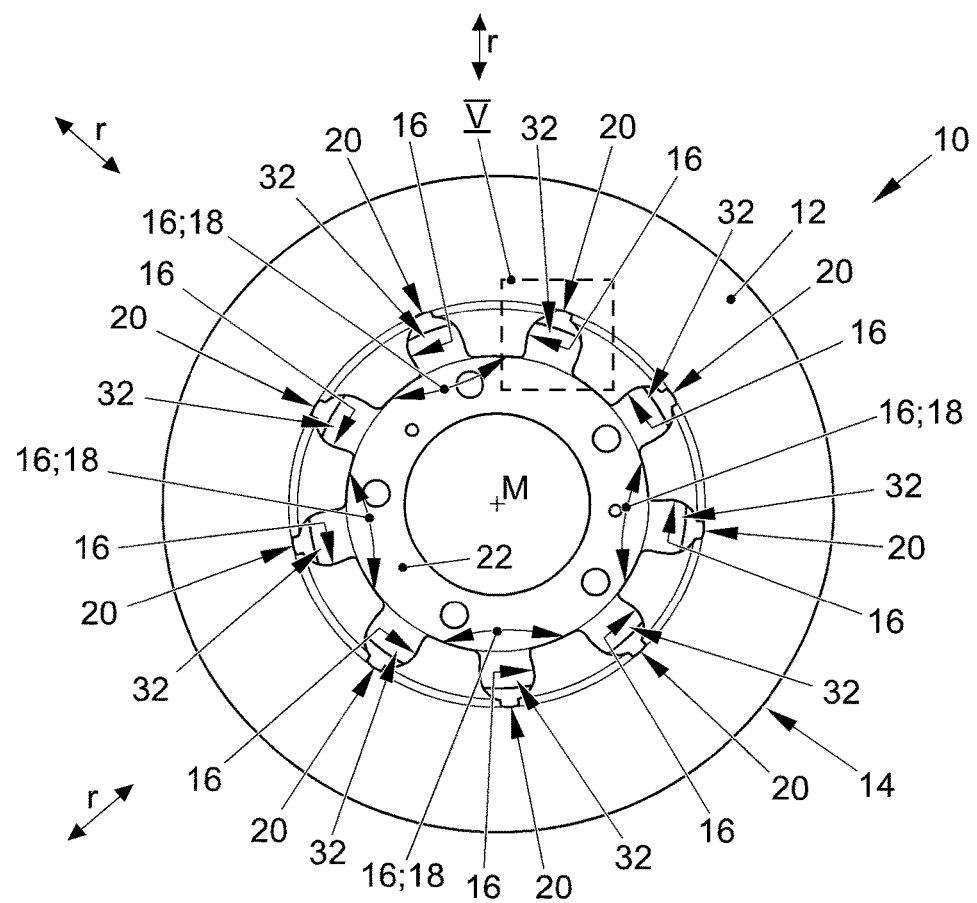
FIG. 4 shows the brake disc of the invention, shown in FIG. 3, in the assembled state in a side view.
Figure 5:
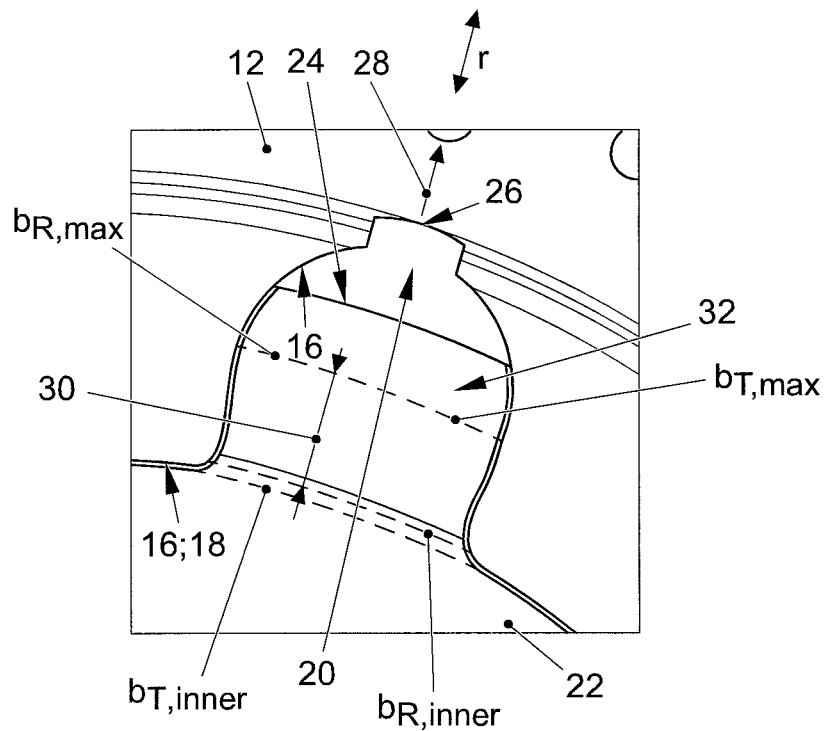
FIG. 5 shows the area, labeled with V in FIG. 4, of the brake disc in an enlarged illustration.

FIGS. 3 to 5 show a second embodiment of a brake disc 10 of the invention. The same reference characters as in FIGS. 1 and 2 are used hereafter for identical or at least functionally equivalent elements of this embodiment.

The embodiment shown in FIGS. 3 to 5 differs substantially in the geometric design of projections 32, which can be clearly seen in FIGS. 3 and 5 and are formed on hub 22. These have a linear outer contour on their outer side. Side, arcuate outer contours, which are formed with a hypocycloid shape, join this linear outer contour.

Further, hub 22, as is evident in FIG. 5, has an inner region 34 and an outer region 36 extending in the axial direction opposite to inner region 34. Projections 32 are formed spaced apart from inner region 34 on outer region 36 and form the outermost boundary of hub 22 as viewed in the radial direction. Inner region 34 has a plurality of circular recesses for screwing hub 22 to a wheel hub.

Figure 6:
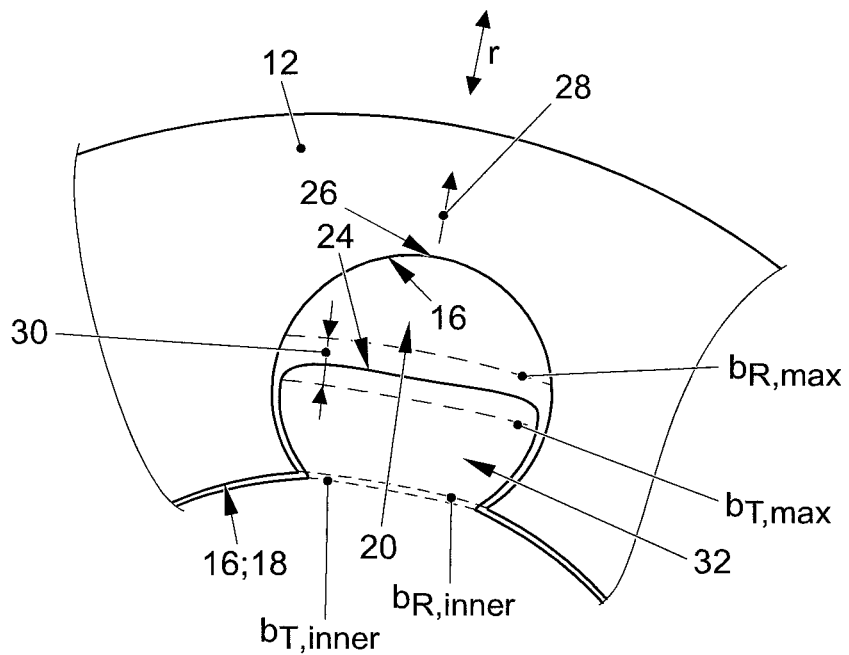
FIG. 6 shows an alternative design of a brake disc of the invention in the area of a projection of a hub and a recess of a friction ring similar to the illustration in FIG. 5.

FIG. 6 shows an alternative design of a brake disc 10 of the invention in the area of a projection 32 of a hub 22 and a recess 20 of a friction ring 12 similar to the illustration in FIG. 5. In this embodiment, $b_{R,max}$ is outside projection 32.

In the exemplary embodiments, a thermal expansion of friction ring 12 results in one or more contact areas between recesses 20 of friction ring 12 and projections 32 of hub 22 in a region formed in a radial direction between the areas designated with $b_{R,max}$ and $b_{R,inner}$ in FIGS. 2, 5, and 6. In these areas, a radially at least partially internally directed restoring force is achieved, which increases with an increasing thermal expansion.

A contact point K and a restoring force R acting on this point are identified in FIG. 2 by way of example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A brake disc comprising:
   a friction ring;
   a hub formed as a separate element and arranged inside the friction ring;
   at least two recesses formed in an inner circumference of the friction ring to connect the hub to the friction ring; and
   at least two projections formed on the hub that engage with the recesses of the friction ring to transfer torque from the friction ring to the hub,
   wherein the recesses have an undercut at least partially in a radial direction from an outer circumference of the friction ring towards the inner circumference,
   wherein the recesses formed in the friction ring and the corresponding projections formed in the hub are configured such that a thermal expansion due to the geometries of the recesses and the projections on the friction ring in the area of the recesses produces a force acting inward at least partially in the radial direction,
   wherein the friction ring is fixed relative to the hub against expansion in the radial direction solely by the undercut and/or by a force produced by the thermal expansion and acting at least partially radially inward,
   wherein the recesses and/or the projections are formed using a tool that is moved at least partially on a hypocycloid curve, and
   wherein the projections are formed monolithic with the hub, and wherein an exterior surface of the projections directly contact an exterior surface of the recesses by the thermal expansion of the friction ring.

2. The brake disc according to claim 1, wherein the recesses have at least in part a contour continuous in side view, an arcuate contour, polygonal contour, and/or cycloid-shaped contour.

3. The brake disc according to claim 1, wherein the friction ring has an inner side with arcuate sections, wherein the recesses extend radially outward from the arcuate sections, and wherein the recesses at least in part have at least one region that is further outward as viewed in the radial direction and in which the recess is broader in the circumferential direction than in the area of the arcuate section.

4. The brake disc according to claim 1, wherein at least three recesses with undercuts are formed in the friction ring and at least three corresponding projections, engaging in the area of the undercuts, are formed in the hub.

5. The brake disc according to claim 1, wherein the hub comprises a circular inner region and an outer region, extending at least partially in the axial direction from the inner region, and wherein the projections are formed in the outer region.

6. The brake disc according to claim 1, wherein the friction ring and the hub are made of different materials.

7. The brake disc according to claim 1, wherein the hub is produced as a cast part or forged part and is finished mechanically by turning and/or milling.

8. A brake disc comprising:
   a friction ring;
   a hub formed as a separate element and arranged inside the friction ring;
   at least two recesses formed in an inner circumference of the friction ring to connect the hub to the friction ring; and
   at least two projections formed on the hub that engage with the recesses of the friction ring to transfer torque from the friction ring to the hub,
   wherein the recesses have an undercut at least partially in a radial direction from an outer circumference of the friction ring towards the inner circumference,
   wherein the recesses formed in the friction ring and the corresponding projections formed in the hub are configured such that a thermal expansion due to the geometries of the recesses and the projections on the friction ring in the area of the recesses produces a force acting inward at least partially in the radial direction,
   wherein the friction ring is fixed relative to the hub against expansion in the radial direction solely by the undercut and/or by a force produced by the thermal expansion and acting at least partially radially inward, wherein the recesses and/or the projections are formed using a tool that is moved at least partially on a hypocycloid curve, and wherein the recesses are substantially circular-shaped and each have a point at which a maximum radius is provided and wherein distal ends of the projections terminate within the recesses at a point that is below the maximum radius.

\* \* \* \* \*